United States Patent
Furukawa

(10) Patent No.: US 11,483,757 B2
(45) Date of Patent: Oct. 25, 2022

(54) WIRELESS ROUTE CONTROL METHOD, WIRELESS COMMUNICATION SYSTEM, AND WIRELESS NODE

(71) Applicant: PicoCELA Inc., Tokyo (JP)

(72) Inventor: Hiroshi Furukawa, Tokyo (JP)

(73) Assignee: PICOCELA INC., Tokyo (JP)

( * ) Notice: Subject to any disclaimer, the term of this patent is extended or adjusted under 35 U.S.C. 154(b) by 22 days.

(21) Appl. No.: 17/052,225

(22) PCT Filed: May 2, 2018

(86) PCT No.: PCT/JP2018/017527
§ 371 (c)(1),
(2) Date: Nov. 2, 2020

(87) PCT Pub. No.: WO2019/211907
PCT Pub. Date: Jul. 11, 2019

(65) Prior Publication Data
US 2021/0250841 A1     Aug. 12, 2021

(51) Int. Cl.
*H04W 40/12*     (2009.01)
*H04W 84/12*     (2009.01)

(52) U.S. Cl.
CPC ............ *H04W 40/12* (2013.01); *H04W 84/12* (2013.01)

(58) Field of Classification Search
None
See application file for complete search history.

(56) References Cited

U.S. PATENT DOCUMENTS

| 2007/0097945 | A1 | 5/2007 | Wang et al. |
| 2012/0320781 | A1* | 12/2012 | Furukawa ............ H04W 40/14 370/252 |
| 2016/0182306 | A1 | 6/2016 | Liu |
| 2017/0135104 | A1* | 5/2017 | Emmanuel ........... H04W 40/12 |

(Continued)

FOREIGN PATENT DOCUMENTS

| JP | 2004282268 A | 10/2004 |
| JP | 2005143046 A | 6/2005 |
| JP | 2011193341 A | 9/2011 |

(Continued)

OTHER PUBLICATIONS

International Search Report from International Application No. PCT/JP2018/017527 dated Jul. 17, 2018.

(Continued)

*Primary Examiner* — Brian S Roberts
(74) *Attorney, Agent, or Firm* — Brundidge & Stanger, P.C.

(57) ABSTRACT

A control signal used for selecting a parent node in a tree route is transmitted from a first wireless node among a plurality of wireless nodes which constitute a backhaul network. Second wireless nodes each select, as a parent node, one of transmission source nodes of a plurality of control signals on the basis of an index indicating the radio wave propagation quality of a route through which each of the control signals received from different route has been propagated. Fixed wireless nodes among the second wireless nodes each transmit the received control signal to the other second wireless nodes, and a movable wireless node among the second wireless nodes terminates the received control signal.

7 Claims, 12 Drawing Sheets

(56) References Cited

U.S. PATENT DOCUMENTS

2018/0054772 A1* 2/2018 Tan ................... H04W 40/12
2019/0141708 A1* 5/2019 Chen ................ H04W 72/0453

FOREIGN PATENT DOCUMENTS

WO 2011105371 A1 9/2011
WO 2011105371 A1 6/2013

OTHER PUBLICATIONS

Khelifi Nesrine et al: "Efficiency of the RPL repair mechanisms for Low Power and Lossy Networks", 2014 International Wireless Communications and Mobile Computing Conference (IWCMC), IEEE, Aug. 4, 2014(Aug. 4, 2014).
Extended European Search Report dated Nov. 22, 2021 from EP Application No. 18917478.2, 12 pages.

* cited by examiner

WIRELESS ROUTE CONTROL METHOD, WIRELESS COMMUNICATION SYSTEM, AND WIRELESS NODE

CROSS-REFERENCE TO RELATED APPLICATION

This application is based upon and claims the benefit of priority of the prior PCT Application No. PCT/JP2018/17527, filed on May 2, 2018, the entire contents of which are incorporated herein by reference.

TECHNICAL FIELD

The present invention relates to a wireless route control method, a wireless communication system, a wireless node, and a wireless route control program.

BACKGROUND ART

Most of existing cellular communication systems employ a configuration in which a base station providing a wireless access link for a user apparatus and a backbone network (may also be referred to as a core network) are connected to each other by a wired backhaul (BH) network.

Meanwhile, as one configuration for realizing the new generation mobile communication, a system or a network that connects between a plurality of wireless nodes (for example, base stations or access points) that provide a wireless communication area having a radius of several tens of meters through wireless multi-hop has been under discussion.

For example, with unwiring the BH network that is one infrastructure of the mobile communication by the wireless multi-hop, it is possible to eliminate the need for laying of wired cables, and thus, possible to reduce the laying cost needed for introducing the mobile communication system.

CITATION LIST

Patent Literature

PTL 1
Japanese Patent Application Laid-Open No. 2005-143046
PTL 2
WO 2011/105371

SUMMARY OF INVENTION

Technical Problem

The infrastructures of BH-networks are often configured using fixedly installed wireless nodes, such as base stations. For this reason, when the infrastructure of a BH network includes a mobile wireless node (e.g., a terminal apparatus), the route control sometimes becomes inappropriate. For example, when the terminal apparatus is set by the route control in the BH network to be a wireless node to perform relay processing of signals, the power consumption of the terminal apparatus increases with the relay processing.

One object of the present invention is to achieve an appropriate route control when a mobile wireless node is included in an infrastructure of a backhaul network.

Solution to Problem

A wireless route control method according to one aspect includes: transmitting a control signal from a first wireless node among a plurality of wireless nodes that form a backhaul network, the control signal being used for selecting a parent node in a tree route; selecting, as a parent node, one of transmission source nodes by each of a plurality of second wireless nodes being different from the first wireless node among the plurality of wireless nodes based on an indicator indicative of a radio wave propagation quality of a route through which each of a plurality of the control signals received through different routes has propagated, the transmission source nodes being of the plurality of control signals, respectively; transmitting, by a fixed wireless node among the plurality of second wireless nodes, the received control signal to another one or more of the plurality of second wireless nodes; and terminating, by a mobile wireless node among the plurality of second wireless nodes, the received control signal.

A wireless communication system according to one aspect includes: a first wireless node among a plurality of wireless nodes that form a backhaul network, the first wireless node transmitting a control signal used for selecting a parent node in a tree route; a plurality of second wireless nodes being different from the first wireless node among the plurality of wireless nodes, each of the plurality of second wireless nodes determining, as a parent node, one of transmission source nodes based on an indicator indicative of a radio wave propagation quality of a route through which each of a plurality of the control signals received through different routes has propagated, the transmission source nodes being of the plurality of control signals, respectively, in which a fixed wireless node among the plurality of second wireless nodes transmits the received control signal to another one or more of the plurality of second wireless nodes, and a mobile wireless node among the plurality of second wireless nodes terminates the received control signal.

A wireless node according one aspect is a node being one of a plurality of second wireless nodes different from a first wireless node among a plurality of wireless nodes that form a backhaul network, the wireless node including a setting section that sets, in a storage section, information indicating whether the second wireless node is mobile; a reception section that receives a control signal used for selecting a parent node in a tree route, the control signal being transmitted by the first wireless node; a determination section that determines, as a parent node, one of transmission source nodes based on an indicator indicative of a radio wave propagation quality of a route through which each of a plurality of the control signals received through different routes has propagated, the transmission source nodes being of the plurality of control signals, respectively; and a transmission section that transmits the received control signal when the information is not indicative of being mobile, and that terminates the received control signal when the information is indicative of being mobile.

A wireless route control program according to one aspect causes a processor to execute processing, the processor being included in one of a plurality of second wireless nodes different from a first wireless node among a plurality of wireless nodes that form a backhaul network, the processing including: setting, in a storage section, information indicating whether the second wireless node is mobile; receiving a control signal used for selecting a parent node in a tree route, the control signal being transmitted by the first wireless node; determining, as a parent node, one of transmission source nodes based on an indicator indicative of a radio wave propagation quality of a route through which each of a plurality of the control signals received through different routes has propagated, the transmission source nodes being of the plurality of control signals, respectively; and transmitting the received control signal when the information is not indicative of being mobile, and terminating the received control signal when the information is indicative of being mobile.

Advantageous Effects of Invention

It is possible to achieve an appropriate route control when an infrastructure of a backhaul node includes a mobile wireless node.

DESCRIPTION OF EMBODIMENTS

Figure 1:
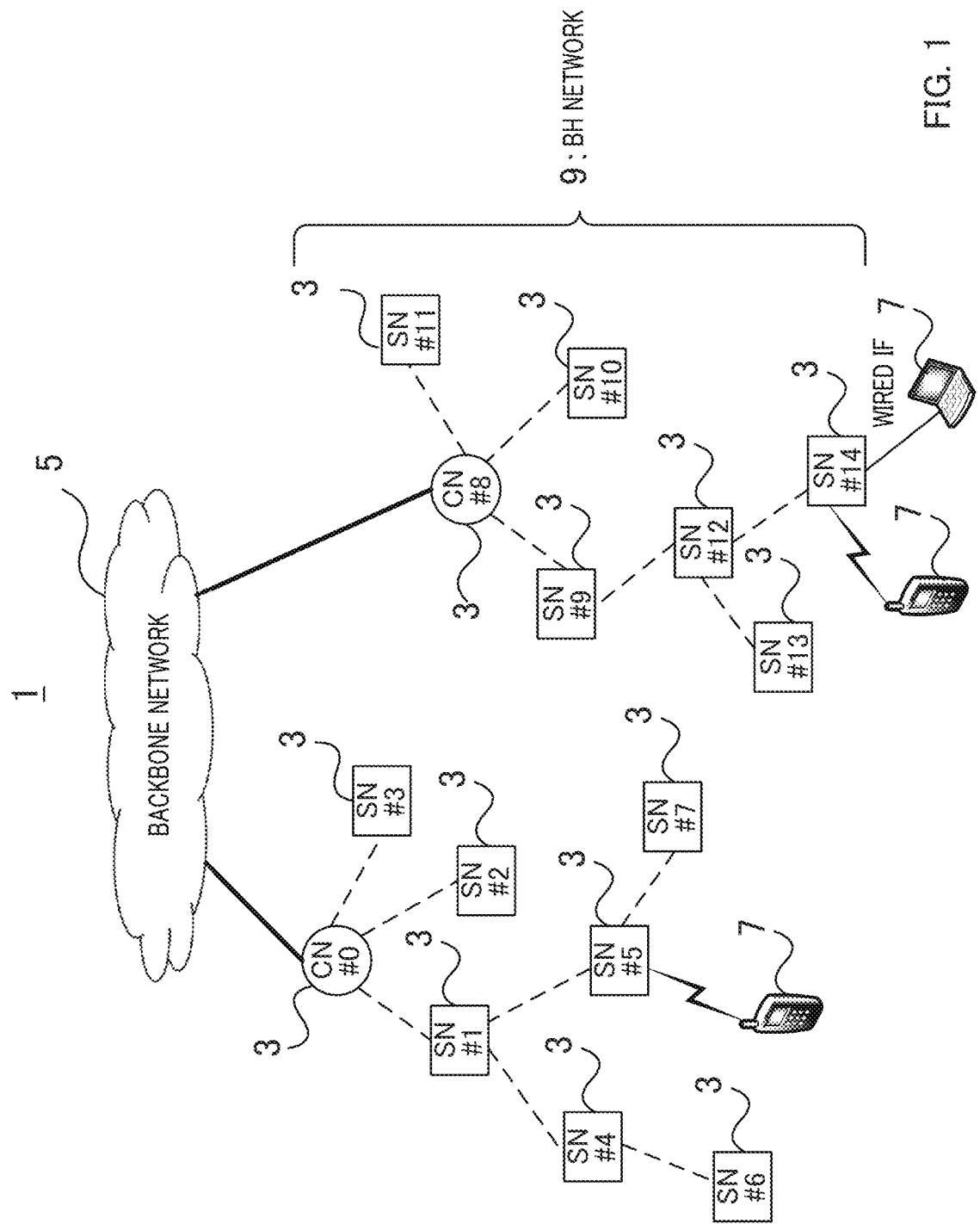
FIG. 1 is a block diagram illustrating a configuration example of a wireless communication system according to one embodiment.

The embodiments are described below with reference to the accompanying drawings, as appropriate. The same elements are denoted by the same reference characters throughout the entire description unless otherwise noted. The features described below with the accompanying drawings are for describing an embodiment and are not for indicating a sole embodiment. For example, when the order of operations is indicated in the embodiment, the order of the operations may be changed, as appropriate, as long as there is consistency as a whole operation.

When a plurality of embodiments and/or variations are exemplified, some configurations, functions and/or operations in a certain embodiment and/or variation may be included in another embodiment and/or variation, or may be replaced with the configurations, functions and/or operations of the other embodiment and/or variation as long as there is consistency.

In the embodiment, excessively detailed descriptions may be omitted. For example, in order to prevent the description from becoming excessively lengthy and/or the technical features or concept from becoming ambiguous and facilitate the understanding of a person skilled in the art, the detailed description of publicly-known or well-known technical features may be omitted. Overlapping descriptions of substantially same configurations, functions and/or operations may be omitted.

The accompanying drawings and the description below are provided in order to assist the understanding of the embodiment, and it is not intended to thereby limit the subject described in the claims. The terms used in the description below may be replaced with other terms, as appropriate, in order to assist the understanding of a person skilled in the art.

Configuration Example of System

FIG. 1 is a block diagram illustrating a configuration example of a wireless communication system according to one embodiment. Wireless communication system 1 illustrated in FIG. 1 includes a plurality of nodes 3, for example. In FIG. 1, as one non-limiting example, 15 nodes 3 denoted by node numbers #0 to #14 are exemplified. The number of nodes 3 may be two or more and less than 14 or may be 16 or more.

Individual nodes 3 are one exemplary wireless devices capable of performing wireless communication. Therefore, each of nodes 3 may be referred to as "wireless node 3". Communication protocols conforming to (or based on) wireless local area network (LAN) related standards such as IEEE 802.11b/g/a/n/ac/ad/ay may be applied to the wireless communication.

Individual nodes 3 form areas in which wireless communication is available. The "areas in which wireless communication is available" may be referred to as "wireless communication areas", "wireless areas", "communication areas", "service areas", "coverage areas", "cover areas", or the like. The wireless communication area formed by node 3 conforming to or based on the wireless LAN related standard may be understood to correspond to a "cell" that is a term used in cellular communication. For example, the wireless communication areas formed by individual nodes 3 may be understood to be correspond to "femtocells" that are classified as "small cells".

Each of nodes 3 is available to perform wireless communication with other nodes 3 when each of the nodes 3 is located in the service area(s) of other node(s) 3. Plurality of nodes 3 form wireless backhaul (BH) network 9 that wirelessly relays the communication between backbone network 5 and terminal apparatus 7, for example. The "wireless BH network" may be referred to as a "BH network" by omitting the expression "wireless".

The "BH network" may be referred to as a "relay network". Individual nodes 3 that are entities of BH network 9 may be referred to as "relay nodes".

Backbone network 5 is an exemplary large scale communication network, such as the Internet. The "backbone network" may be referred to as a "core network", a "global network" instead.

The route or the section through which a wireless signal is transmitted in BH network 9 may be mutually replaced with a "wireless BH communication route", a "wireless BH transmission route", a "wireless BH line", a "wireless BH connection", or a "wireless BH channel". In those terms, the expression "wireless" may be omitted, and the expression "BH" may be replaced with the expression "relay".

Meanwhile, for example, the section in which the wireless signal is transmitted between terminal apparatus 7 and BH network 9 may be referred to as a "wireless access line" or a "wireless access channel". In those terms, the expression "wireless" may be omitted.

In the description below, the term "signal" may be replaced with a term such as "frame" or "packet" with a unit of signal segmented in time.

Frequencies (or channels) that are different from each other may be allocated to the wireless BH line and the wireless access line. As one non-limiting example, a 5 GHz band (for example, from 5.15 GHz to 5.85 GHz) frequency (or channel) may be allocated to the BH line.

A 2.4 GHz band (for example, from 2.412 GHz to 2.472 GHz) frequency (or channel) may be allocated to the access line. A 5 GHz band frequency may be allocated to the access line when the frequency is different from the frequency allocated to the BH line.

At least one of a 5.2 GHz band (W52: from 5,150 MHz to 5,250 MHz), a 5.3 GHz band (W53: from 5,250 MHz to 5,350 MHz), and a 5.6 GHz band (W56: from 5,470 MHz to 5,725 MHz), for example, may be included in the 5 GHz band.

The number of channels available in W52 is four, that is, 36 ch, 40 ch, 44 ch, and 48 ch. The number of channels available in W53 is four, that is, 52 ch, 56 ch, 60 ch, and 64 ch. The number of channels available in W56 is 11, that is, 100 ch, 104 ch, 108 ch, 112 ch, 116 ch, 120 ch, 124 ch, 128 ch, 132 ch, 136 ch, and 140 ch.

Therefore, for example, when one or two frequency bands among W52, W53, and W56 are allocated to the access line, the remaining one or two frequency bands that are not allocated to the access line among W52, W53, and W56 may be allocated to the BH line.

Some nodes 3 among a plurality of nodes 3 may be connected to backbone network 5 with a wired connection. In FIG. 1, an aspect in which two nodes, that is, node #0 and node #8 are connected to backbone network 5 with a wired connection is exemplified. For example, a LAN cable or an optical fiber cable may be applied to the wired connection.

Node #0 and node #8 connected to backbone network 5 with a wired connection may be referred to as "core nodes (CNs)". Individual nodes 3 among a plurality of nodes 3 that form BH network 9 other than CNs #0 and #8 may be referred to as "slave nodes (SNs)". For example, in FIG. 1, nodes #1 to #7 and #9 to #14 are all SNs. CNs 3 are one example of "first wireless nodes", and each of SNs 3 is one example of a "second wireless node".

In FIG. 1, #0 to #14 denoting individual nodes 3 are one example of information used in the identification of individual nodes 3 (hereinafter may be abbreviated to "node identification information"). Information available to uniquely identify individual nodes 3 in same BH network 9 is sufficient for the node identification information, and such information may be a node number, an identifier of a device, address information, for example. One non-limiting example of address information is a Media Access Control (MAC) address.

BH network 9 may have one or more tree structures (may be referred to as "tree topologies") in which one CN 3 (#0 or #8) is the root node. For example, as illustrated in FIG. 1, in BH network 9, a first tree topology in which CN #0 is the root node and a second tree topology in which CN #8 is the root node may be created.

In other words, in BH network 9, a "tree topology" may be created for every CN 3. The one or more "tree topologies" created in BH network 9 may be referred to as "tree clusters", "tree sub-clusters", or the like. In BH network 9, the number of CNs 3 is not limited to two, and may be one or three or more.

In the tree topology, SN 3 that does not have a child node may be referred to as a "leaf node", and SN 3 that has a child node may be referred to as an "internal node". For example, in FIG. 1, SNs #2, #3, #6, #7, #10, #11, #13, and #14 are all equivalent to a "leaf node". SNs #1, #4, #5, #9, and #12 are all equivalent to an "internal node".

In the wireless BH line, a "downstream line" in the direction from core node 3 toward leaf node 3 and an "upstream line" in the direction from leaf node 3 to core node 3 may be included. The "downstream line" and the "upstream line" may be referred to as a "downlink (DL)" and an "uplink (UL)" after the address terms in the cellular communication.

The flow of the signal (downlink signal) in the "downstream line" may be referred to as a "downstream", and the flow of the signal (uplink signal) in the "upstream line" may be referred to as an "upstream". A control signal and a data signal may be included in each of the "downlink signal" and the "uplink signal". A signal that does not correspond to the "data signal" may be included in the "control signal".

The "child node" may be understood to be equivalent to a node (downstream node) connected to the downstream of a certain node upon focusing on the "downstream line". A node connected to the upstream of a certain node upon focusing on the downstream line may be referred to as a "parent node" or an "upstream node". Upon focusing on the "upstream line", the relationship between the "child node" (downstream node) and the "parent node" (upstream node) is reversed.

Upon focusing on the "downstream line", the "core node" may be referred to as a "start node" or an "origin node", and the "leaf node" may be referred to as an "end node" or an "edge node". The "internal node" may be referred to as an "intermediate node" or a "relay node".

The route (tree topology) of the tree structure in BH network 9 may be created on the basis of the metric of the route (hereinafter may be abbreviated to a "route metric") leading to predetermined SN 3 from CN 3, for example. In the route metric, an indicator (hereinafter referred to as a "propagation quality indicator") indicating the quality or the capacity of the radio wave propagation in the wireless section leading to predetermined SN 3 from CN 3 may be used.

As one non-limiting example of the propagation quality indicator, the received power or the received strength (for example, RSSI; Received Signal Strength Indicator) of a wireless signal, the radio wave propagation loss, the propagation delay, and the like may be listed. The "radio wave propagation loss" may be replaced with a "path loss".

One combination or two or more combinations selected from the indicator candidates above may be used in the propagation quality indicator. In this embodiment, an indicator relating to the distance of the route such as the number of hops does not necessarily need to be used in the propagation quality indicator.

For example, by transmitting a signal (for example, a control signal) by designating CN 3 as the starting point, the radio wave propagation loss in the wireless section may be obtained in reception node 3 for each wireless section between transmit node 3 and reception node 3 of the control signal.

When each of reception nodes 3 transmits the information on the obtained radio wave propagation loss by including the information in the control signal, information on the cumulative radio wave propagation loss (in other words, a cumulative value) in the wireless section in which the control signal has been propagated may be sent between nodes 3.

For example, individual nodes 3 calculate a route metric on the basis of the cumulative radio wave propagation loss for each upstream node candidate that is a transmission source of the control signal, and selects one of nodes 3 of which route metric is the smallest, for example, from the upstream node candidates. As a result, a route of a tree structure in which the radio wave propagation loss is the smallest is created.

The route (hereinafter may be referred to as a "tree route") of the tree structure may be dynamically or adaptively updated by regularly or irregularly transmitting a control signal by designating CN 3 as the starting point.

The processing or control relating to the creation and update of the tree route as above may be hereinafter referred to as "tree route control", or "dynamic tree route control" or "adaptive tree route control" for the sake of convenience.

In the wireless BH line of this embodiment, the downlink signal (for example, a data signal) may be transmitted from CN 3 toward the downstream of the tree route periodically and intermittently (in other words, after waiting for an intentional transmission waiting time). The periodical and intermittent transmission as above may be referred to as "intermittent periodic transmission" (IPT).

In the IPT, as described in PTL 1 described above, a transmission period (in other words, a transmission interval or a transmission frequency) of the downlink signal to be transmitted from CN 3 toward the downstream is changed in accordance with a frequency reuse interval. The frequency reuse interval indicates the length (distance) of the section in which the occurrence of the interference between the nodes in the same route is suppressed and the same frequency may be repeatedly reused.

By setting the transmission period in accordance with the frequency reuse interval for CN 3, the throughput can be improved, in other words, the relay transmission efficiency can be improved in the wireless BH line without the need of complex congestion control, for example. In addition, the utilization efficiency of the frequency resource in BH network 9 can be improved.

For example, by setting the frequency reuse interval in which the occurrence of the interference between the nodes is suppressed for CN 3, the throughput observed in a leaf node can be maintained at a certain value or more without depending on the number of hops even when a single frequency is used in the tree topology.

For the upstream line, the throughput observed in CN 3 can be improved when SN 3 transmits an uplink signal toward the upstream in accordance with the transmission period linked to the transmission period in accordance with the frequency reuse interval of the downlink line, for example.

Therefore, TDMA or TDD is also easily realized by allocating the same frequency (channel) to the downstream line and the upstream line of the wireless BH line, for example. The "TDMA" is an abbreviation for time division multiple access, and "TDD" is an abbreviation for time division duplex.

Therefore, wireless IFs of different frequencies do not necessarily need to be individually used for the downstream line and the upstream line of the wireless BH line, and a common wireless IF is allowed to be used. By using a common wireless IF, it is possible to downsize and/or reduce costs of nodes 3.

However, different frequencies may be allocated to the downstream line and the upstream line of the wireless BH line. By allocating different frequencies to the downstream line and the upstream line of the wireless BH line, it is possible to simplify IPT control for realizing TDMA or TDD, for example. Even when different frequencies are allocated to the downstream line and the upstream line, two channels, that is, the downstream line and the upstream line are sufficient for the consumption of the frequency resource in BH network 9.

A wired line may be included in a part of the downstream line and/or the upstream line of the BH line. When a wired line is included in a part of the downstream line and/or the upstream line of the BH line, the route metric of the wired section may be calculated by a predetermined value (for example, the minimum value) that is smaller than the propagation loss of the wireless section.

When terminal apparatus 7 is located in the service area of any of SNs 3, terminal apparatus 7 communicates with backbone network 5 via the BH line by being connected to any of plurality of SNs 3 forming BH network 9 through the wireless access line. Terminal apparatus 7 may be connected to any of SNs 3 (SN #14 as one example in FIG. 1) through a wired line (wired IF). As one non-limiting example, terminal apparatus 7 may be a mobile terminal such as a mobile phone, a smartphone, and a tablet terminal.

Any of code division multiple access (CDMA), frequency division multiple access (FDMA), time division multiple access (TDMA), orthogonal frequency division multiple access (OFDMA), single carrier frequency division multiple access (SC-FDMA), and the like may be applied to the wireless access line, for example. The OFDMA may be embodied by a wireless technology such as IEEE 802.11, IEEE 802.16, long term evolution (LTE), LTE-Advanced, and the like, for example.

A multiple input multiple output (MIMO) technology by an antenna array including a plurality of antenna elements may be applied to all or a part of the downstream line and/or the upstream line in the wireless BH line and/or the wireless access line.

For example, beam forming using the antenna array may be performed in the downstream line and/or the upstream line of any one or more sections between CN 3 and SN 3, between SN 3 and SN 3, and between SN 3 and terminal apparatus 7.

The term "transmission" of a signal may be hereinafter mutually replaced with other terms such as "relaying", "transfer", "propagation", "sending", "routing", or "forwarding" of a signal. The "relaying" of a signal may be replaced with the "bridging" of a signal.

The term "transmission" of a signal may include the meaning of "flooding", "broadcasting", "multicasting", "unicasting", or the like of a signal. The term "connection" of a line may be understood to mean a state in which a wired and/or wireless communication link is "established" or "linked up".

The term "apparatus" may be mutually replaced with terms such as "circuit" (or "circuitry"), "device", "unit", or "module". The term "interface (IF)" may be mutually replaced with terms such as "adaptor", "board", "card", "module", or "chip".

The term "terminal apparatus" may be mutually replaced with terms such as a mobile station, a mobile terminal, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, an user agent, a mobile client, or a client.

Node 3 and/or terminal apparatus 7 may be an Internet of things (IoT) device. By the IoT, various "things" may be equipped with a wireless communication function. The various "things" equipped with the wireless communication function may be connected to and communicate with backbone network 5 via the wireless access line and/or the wireless BH line.

For example, the IoT device may include a sensor device, a meter (measuring instrument), or the like having the wireless communication function. Devices having a sensing function and/or a monitoring function such as a monitoring camera and/or a fire alarm equipped with a sensor device and/or a meter may correspond to node 3 and/or terminal apparatus 7. Therefore, BH network 9 may correspond to a sensor network and/or a monitoring network, for example. The wireless communication by the IoT device may be referred to as machine type communications (MTC). Therefore, the IoT device may be referred to as a "MTC device".

One Example of Protocol Stack of Node 3

Figure 2:
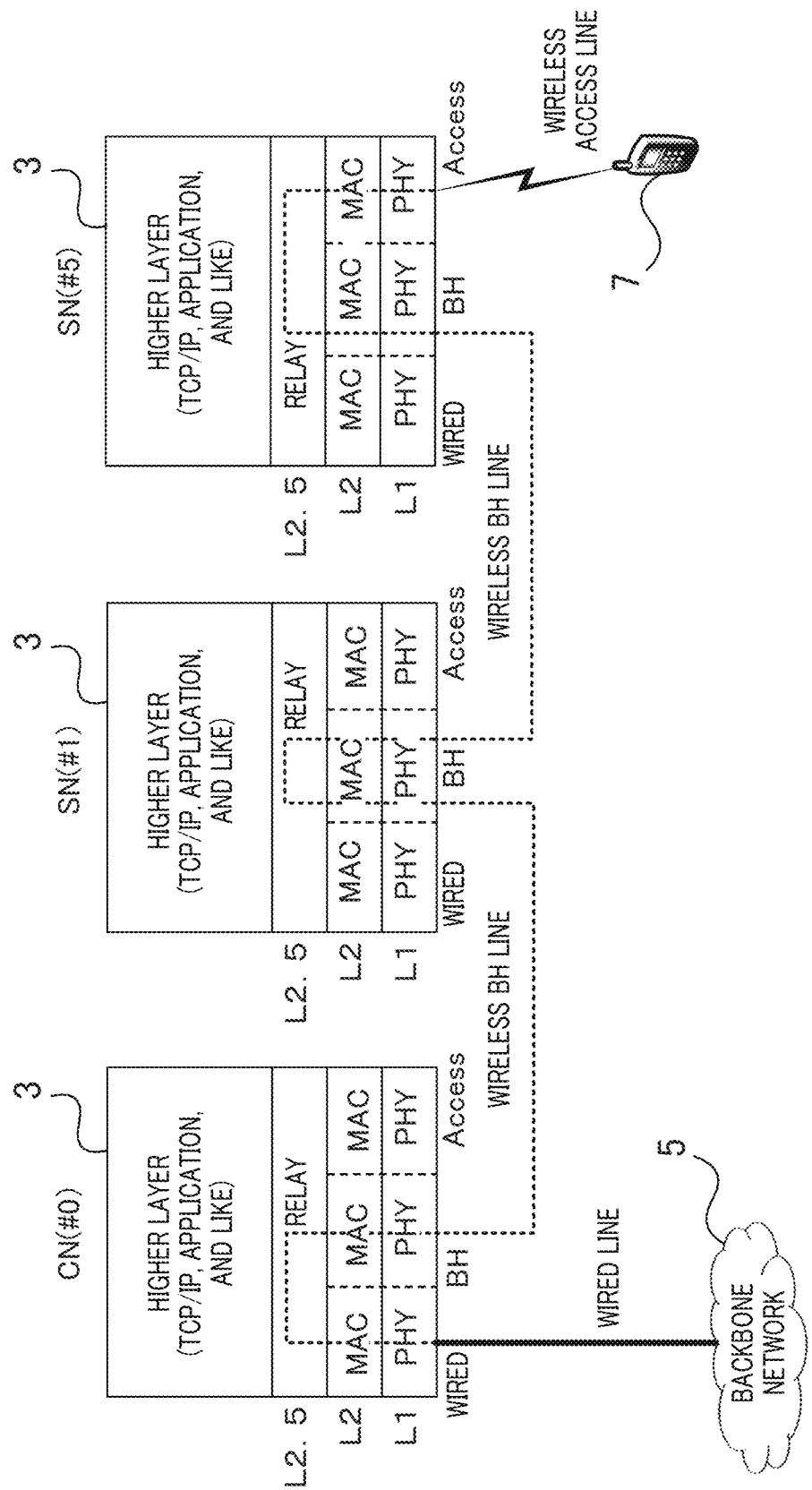
FIG. 2 illustrates one example of a form of connection between nodes according to one embodiment together with protocol stacks of individual nodes.

FIG. 2 illustrates one example of a form of connection between nodes 3 together with the protocol stacks of individual nodes 3. FIG. 2 illustrates CN 3 connected to backbone network 5 by a wired line, and two SNs 3 connected to CN 3 by multi-hop connection by the wireless BH line.

It may be understood that CN 3 in FIG. 2 corresponds to CN #0 in FIG. 1 and two SNs 3 in FIG. 2 respectively correspond to SN #1 and SN #5 in FIG. 1, for example. Terminal apparatus 7 is connected to SN #5 by the wireless access line.

As illustrated in FIG. 2, each of nodes 3 has a protocol stack formed by a physical (PHY) layer (layer 1: L1), a MAC layer (layer 2: L2), a relay layer, and a higher layer equal to or higher than layer 3 (L3), for example. A TCP/IP layer and/or an application layer may be included in the higher layer, for example. The "TCP/IP" is an abbreviation for a "transmission control protocol/Internet protocol".

The "relay layer" is located in an intermediate layer between layer 2 and layer 3 in the protocol stack, and hence may be described as "layer 2.5 (L2.5)" for the sake of convenience. In processing of the relay layer, processing relating to the "adaptive tree route control" and/or processing (or control) relating to the "IPT" described above may be included.

By positioning the "relay layer" as the intermediate layer between layer 2 and layer 3, the processing of the existing MAC layer does not necessarily need to be modified, and hence the implementation of "relay layer" processing is easy. The relay layer processing may be embodied by one or more selected from software, middleware, firmware, and hardware.

For example, the physical layer of node 3 provides one wired connection (wired port) and two wireless connections (wireless ports), and those three ports are indicated as three "PHY" ports in FIG. 2 for the sake of convenience. One of two wireless ports is for the BH line, and the other of the two wireless ports is for the access line. The "port" may be replaced with the "interface (IF)".

In FIG. 2, in order to facilitate the visual understanding of the correspondence relationship among the three PHY ports of the physical layer, the MAC layer is divided into three for the sake of convenience. However, the processing of the MAC layer may be common to the PHY ports.

In FIG. 2, upon focusing on the flow of the downlink signal, the downlink signal from backbone network 5 that is received by CN #0 is transmitted to the downstream BH line from the wireless port for the BH line via the wired port (L1), the MAC layer (L2), and the relay layer (L2.5) of CN #0.

The downlink signal transmitted by CN #0 to the BH line is received at the wireless port for the BH line in SN #1 that is the next hop, and is transmitted to the downstream BH line from the wireless port for the BH line via the MAC layer and the relay layer of SN #1.

The downlink signal transmitted by SN #1 to the downstream BH line is received at the wireless port for the BH line in SN #5 that is the next hop, and is transmitted to terminal apparatus 7 from the wireless port for the access line via the MAC layer of SN #5. The downlink signal transmitted to the access line from the BH line does not need to pass through the relay layer.

The uplink signal is transmitted to backbone network 5 from terminal apparatus 7 via SN #5, SN #1, and CN #0 tracking a route opposite to the route of the downlink signal described above.

Configuration Example of Node 3

Hardware Configuration Example of Node 3

Figure 3:
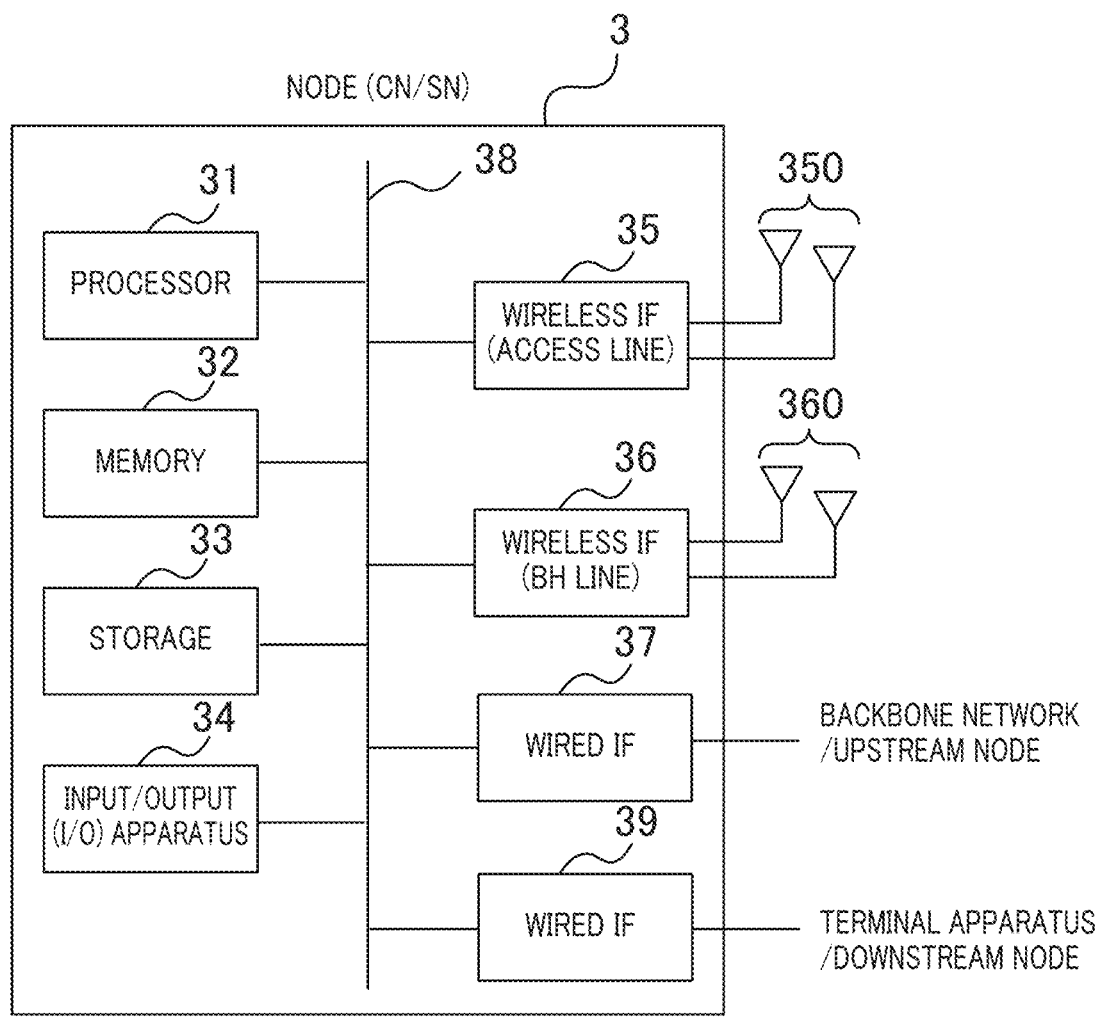
FIG. 3 is a block diagram illustrating a hardware configuration example of the node according to one embodiment.

Next, a hardware configuration example of node 3 is described with reference to FIG. 3. The configuration example exemplified in FIG. 3 may be common to CN 3 and SN 3. As illustrated in FIG. 3, node 3 may include processor 31, memory 32, storage 33, input/output (I/O) apparatus 34, wireless IFs 35 and 36, wired IF 37, wired IF 39, and bus 38, for example.

In the hardware configuration example exemplified in FIG. 3, the increase and decrease of hardware may be performed, as appropriate. For example, a freely-selected hardware block may be added, removed, divided, or integrated into a freely-selected combination, and bus 38 may be added or removed, for example, as appropriate.

Wireless IF 35, wireless IF 36, and wired IF 37 (or wired IF 39) may be understood to correspond to the two wireless ports (PHY ports) and one wired port exemplified in the protocol stack in FIG. 2.

Processor 31, memory 32, storage 33, input/output apparatus 34, wireless IFs 35 and 36, and wired IFs 37 and 39 may be connected to bus 38 and mutually communicate with each other, for example. The number of buses 38 may be one or plural.

Node 3 may include a plurality of processors 31. The processing in node 3 may be executed by one processor 31, or may be executed by a plurality of processors 31. In one or a plurality of processors 31, a plurality of processing may be simultaneously, parallelly, or sequentially executed, or may be executed by other methods. Processor 31 may be a single core processor or a multicore processor. Processor 31 may be implemented using one or more chips.

One or a plurality of functions included in node 3 are realized by causing hardware such as processor 31 and memory 32 to read predetermined software, for example.

The "software" may be mutually replaced with other terms such as "program", "application", "engine", or "software module".

For example, processor 31 reads and executes a program by controlling one or both of read out and writing of data stored in one or both of memory 32 and storage 33. The program may be provided to node 3 by communication via a telecommunication line by at least one of wireless IF 35, wireless IF 36, and wired IF 37, for example.

The program may be a program that causes a computer to execute all or a part of the processing in node 3. One or more functions of node 3 is realized in accordance with the execution of a program code included in the program. All or a part of the program code may be stored in memory 32 or storage 33, or may be described as a part of an operating system (OS).

For example, the program may include a program code that implements a function block described later with reference to FIGS. 4 and 5, or may include a program code that executes one or more flowcharts described later with reference to FIGS. 10 to 12. The program including such a program code described above may be referred to as a "wireless route control program" for the sake of convenience.

Processor 31 is one example of a processing section, and controls the entire computer by operating the OS, for example. Processor 31 may be formed using a central processing unit (CPU) including an interface between node 3 and peripheral apparatuses, a control apparatus, an arithmetic apparatus, a register, and the like.

Processor 31 executes various processing by reading out one or both of a program and data from storage 33 to memory 32, for example.

Memory 32 is one example of a computer-readable recording medium, and may be formed using at least one of a ROM, an EPROM, an EEPROM, a RAM, an SSD, and the like, for example. The "ROM" is an abbreviation for "Read Only Memory", and "EPROM" is an abbreviation for "Erasable Programmable ROM". "EEPROM" is an abbreviation for "Electrically Erasable Programmable ROM", "RAM" is an abbreviation for "Random Access Memory", and "SSD" is an abbreviation for "Solid State Drive".

Memory 32 may be referred to as a register, a cache, a main memory, a work memory, or a main storage apparatus.

Storage 33 is one example of a computer-readable recording medium, and may be formed using at least one of an optical disc such as a compact disc ROM (CD-ROM), a hard disk drive (HDD), a flexible disc, a magneto-optical disc (for example, a compact disc, a digital versatile disc, or a Blu-ray (registered trademark) disc), a smart card, a flash memory (for example, a card, a stick, or a key drive), a flexible disc, a magnetic strip, and the like. Storage 33 may be referred to as an auxiliary storage apparatus. The recording medium described above may be a database, a server, and other appropriate media including one or both of memory 32 and storage 33, for example.

Input/output (I/O) apparatus 34 is one example of an input device that receives an input of a signal from the outside of node 3 and an output device that outputs a signal to the outside from node 3. In the input device, one or more of a keyboard, a mouse, a microphone, a switch, a button, and a sensor may be included, for example. In the output device, one or more of a display, a speaker, and a light emitting device such as a light emitting diode (LED) may be included, for example.

The button may include a power button and/or a reset button, for example. The power button is operated for the startup and the shutdown of node 3, for example. The reset (or rerouting) button is operated in order to command an intentional reset and/or recreation (or rerouting) of the tree route, for example.

Input/output apparatus 34 may have individual configurations for the input and the output. Input/output apparatus 34 may have a configuration in which the input and the output are integrated as in a touch panel display, for example.

Wireless IF 35 performs transmission and reception of the wireless signal in the access line between wireless IF 35 and terminal apparatus 7, for example. In wireless IF 35, one or more antennas 350 and a baseband (BB) signal processing circuit, a MAC processing circuit, an up converter, a down converter, and an amplifier (not illustrated) may be included, for example.

In a BB signal processing circuit of wireless IF 35, an encoding circuit and a modulation circuit for encoding and modulating the transmission signal, and a demodulation circuit and a decoding circuit for demodulating and decoding the reception signal may be included, for example.

Wireless IF 36 performs transmission and reception of the wireless signal in the BH line between wireless IF 36 and other SNs 3, for example. In wireless IF 36, as with wireless IF 35, one or more antennas 360, and a BB signal processing circuit, a MAC processing circuit, an up converter, a down converter, and an amplifier (not illustrated) may be included.

In the BB signal processing circuit of wireless IF 36, an encoding circuit and a modulation circuit for encoding and modulating a transmission signal, and a demodulation circuit and a decoding circuit for demodulating and decoding a reception signal may be included, for example.

Antenna 350 of wireless IF 35 and antenna 360 of wireless IF 36 may be respectively referred to as "access line antenna 350" and "BH line antenna 360". One or both of access line antenna 350 and BH line antenna 360 may be a nondirectional omni antenna, or may be an antenna array for which a directivity control is available. Beam forming may be performed by an antenna array including a plurality of directional antennas.

The plurality of directional antennas may be arranged toward different directions, for example. For example, six directional antennas may be arranged in positions shifted from each other by 60 degrees. When a plurality of antennas available to communicate with other nodes 3 that are communication partners present in node 3 in a case where a tree route described later is created in BH network 9, establishment of wireless connection with other nodes 3 may be performed with an antenna having the best communication quality (e.g., the gain or the electric power), and the use of the antenna may be continued in the communication of the tree route after the establishment of wireless connection. However, the antenna used in the establishment of wireless connection and the antenna used in the communication of the tree route after the establishment of wireless connection may be different from each other.

Wired IF 37 performs wired communications of transceiving a signal with backbone network 5 and/or upstream node 3, for example. Wired IF 39 performs wired communications of transceiving a signal with terminal apparatus 7 and/or downstream node 3, for example. A network interface conforming to the Ethernet (registered trademark) standard may be used for wired IFs 37 and 39, for example Wired IF 37 only needs to be included in at least CN 3, and need not necessarily be included in SN 3 (in other words, may be optional for SN 3). However, when a part of BH line is a wired connection, wired IFs 37 and 39 may be used in the wired connection.

Node 3 may be formed so as to include hardware such as a microprocessor, a DSP, an ASIC, a PLD, and an FPGA. For example, processor 31 may be implemented so as to include at least one of those hardware. By the hardware, a part or all of function blocks described below with reference to FIG. 4 and FIG. 5 may be realized.

The "DSP" is an abbreviation for "Digital Signal Processor", and "ASIC" is an abbreviation for "Application Specific Integrated Circuit". "PLD" is an abbreviation for "Programmable Logic Device", and "FPGA" is an abbreviation for "Field Programmable Gate Array".

Function Configuration Example of Node 3

Next, a functional configuration example of node 3 is described with reference to FIG. 4 and FIG. 5. FIG. 4 is a block diagram illustrating a functional configuration example illustrating node 3 according to one embodiment, and FIG. 5 is a block diagram illustrating a functional configuration example of a control section exemplified in FIG. 4.

Figure 4:
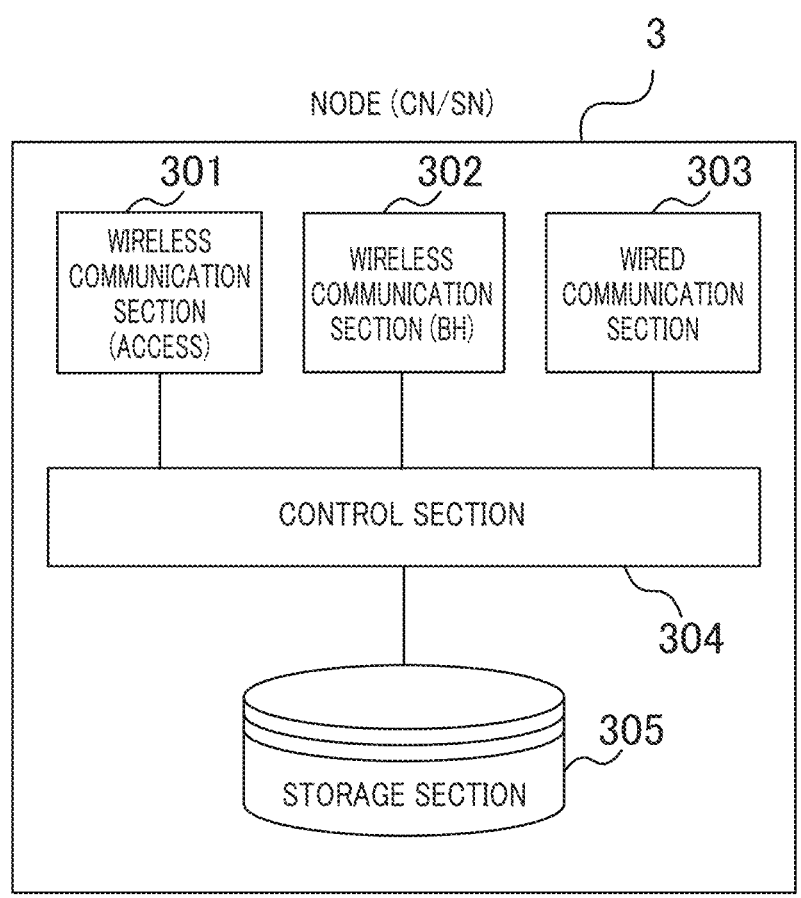
FIG. 4 is a block diagram illustrating a functional configuration example of the node according to one embodiment.

As illustrated in FIG. 4, upon focusing on the functional configuration, node 3 may include wireless communication section 301 for wireless access line, wireless communication section 302 for wireless BH line, wired communication section 303, control section 304, and storage section 305.

Wireless communication section 301 for wireless access line is a function block including wireless IF 35 and access line antenna 350 exemplified in FIG. 3. Wireless communication section 302 for wireless BH line is a function block including wireless IF 36 and BH line antenna 360 exemplified in FIG. 3.

Wired communication section 303 is a function block including wired IFs 37 and 39 exemplified in FIG. 3. Storage section 305 is a function block including one or both of memory 32 and storage 33 exemplified in FIG. 3.

Wireless communication section 301 may include a transmitting section that transmits a control signal and/or a data signal addressed to terminal apparatus 7, and a receiving section that receives the control signal and/or the data signal transmitted by terminal apparatus 7, for example.

Wireless communication section 302 may include a transmission section that transmits a control signal and/or a data signal to other nodes 3, and a reception section that receives a control signal and/or a data signal from other nodes 3, for example.

Wired communication section 303 may include a transmitting section that transmits a control signal and/or a data signal to backbone network 5, and a receiving section that receives the control signal and/or the data signal from backbone network 5, for example.

Control section 304 comprehensively controls the operation of node 3. For example, control section 304 controls the communication via any one or more of the wireless access line, the wireless BH line, and the wired line by providing a control signal to any one or more of wireless communication section 301, wireless communication section 302, and wired communication section 303.

Control section 304 is implemented when processor 31 illustrated in FIG. 3 reads the program stored in storage section 305 and executes the read program, for example.

Storage section 305 stores therein the node identification information described above and a route metric described below, for example. As described below, when a transmission power value of transmission source node 3 is not included in the route creation packet, the transmission power value of transmission source node 3 may be stored in storage section 305.

Configuration Example of Control Section 304

Figure 5:
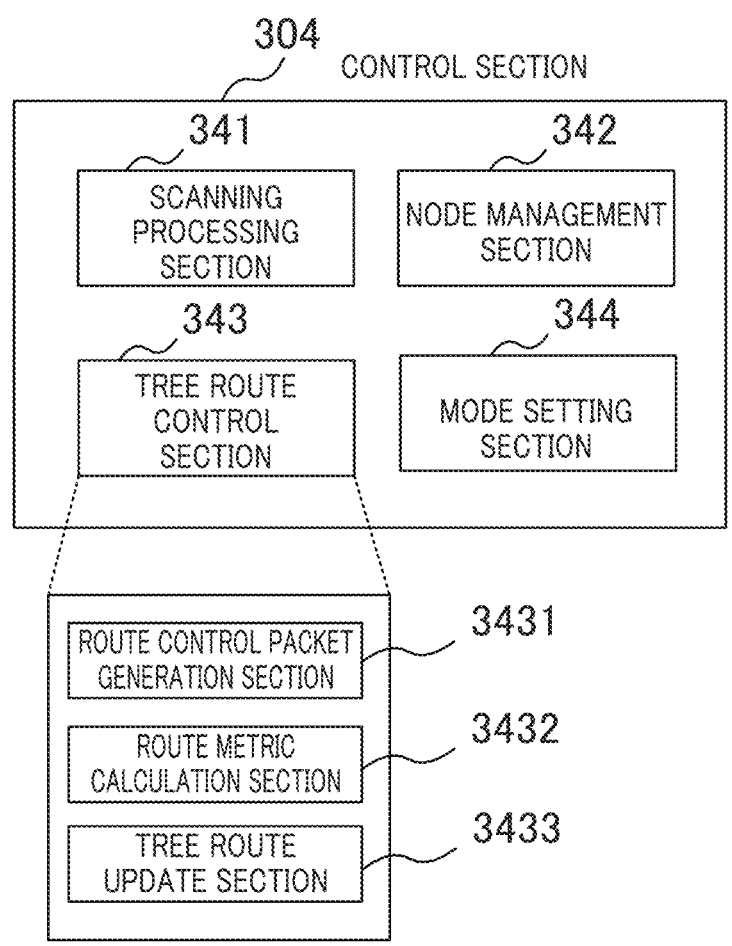
FIG. 5 is a block diagram illustrating a functional configuration example of a control section exemplified in FIG. 4.

As illustrated in FIG. 5, control section 304 may include scan processing section 341, node management section 342, tree route control section 343, and mode setting section 344, for example.

Scan processing section 341 scans and discovers the existence of other nodes 3 located in the periphery (or vicinity) of node 3 in accordance with the startup of node 3, for example. The scanning may be passive scanning or active scanning. When passive scanning is taken as an example, a beacon signal is generated in scan processing section 341 and is transmitted to a surrounding area through wireless communication section 302.

Node 3 that exists in a location in which a reception of the beacon signal is available may be referred to as "peripheral node 3" or "adjacent (or neighboring) node 3".

In the beacon signal, information explicitly or implicitly indicating a service set identifier (SSID) or a basic SSID (BSSID), the transmission period of the beacon signal, and the usable channel (frequency) may be included, for example. The information may be referred to as "basic service set (BSS) related information" for the sake of convenience.

In the case of active scanning, a probe request signal may be generated in scan processing section 341 and be transmitted to a surrounding area through wireless communication section 302. The probe request signal is used to prompt peripheral node 3 to transmit a beacon signal, for example. When a beacon signal is not received within a certain time period in the passive scanning, the active scanning may be executed.

Node management section 342, for example, stores information on peripheral node 3 (e.g., node identification information and BSS-related information) in storage section 305.

Tree route control section 343 controls creation and update of the tree route by transmitting and/or receiving a route control packet to and/or from peripheral node 3.

For example, when node 3 is mobile, mode setting section 344 sets information indicating whether to operate in "mobile mode" (which may be referred to as "mode set information" for the sake of convenience) for tree route control section 343.

The "mobile mode" may be referred to as "Vehicular Mode" and may be abbreviated as "V mode," hereinafter. The term "non-V mode" may be referred to as "still mode" or "fixed mode" instead.

SNs 3 which are not set in "V mode" may include SN 3 implicitly set in "non-V mode" without being limitation to SN 3 which is explicitly set with the mode set information indicating "non-V mode." For example, SN 3 which is not set with the mode set information indicating "V mode" may be treated as SN 3 which is implicitly set in "non-V mode".

For example, when the V mode is a special mode and the "non-V mode" is a default (or normal) mode in SNs 3, SN 3 may be recognized as being set in the "normal mode" unless SN 3 is set with the mode set information indicating the "V mode".

The mode set information may be provided to nodes 3, for example, through any one or more of input/output (I/O) apparatus 34, wireless IF 35 and wireless IF 36, for example. The mode set information given to node 3 is stored, for example, in storage section 305. When the mode set information is stored in storage section 305, it may understood that the mode set has been made for tree route control section 343 that refers to the mode set information.

The mode set information may be previously stored in storage section 305 as static information. In the case of the static mode set information being stored in storage section 305, in other words, in the case of node 3 that requires no mode change, the functions of mode setting section 344 of node 3 may be deactivated (or disabled) or mode setting section 344 may not be provided in node 3.

For example, since CN 3 connected to backbone network 5 via a wired line may be fixedly installed, the functions of mode setting section 344 of CN 3 may be deactivated (or disabled) or mode setting section 344 may not be provided in CN 3.

For SNs 3 as well, for example, when it is known in advance that SN 3 is fixedly installed and does not need to move, the functions of mode setting section 344 of this SN 3 may be deactivated (or disabled) or mode setting section 344 may not be provided in SN 3. For SN 3 which is expected to move, rewritable mode set information may be stored in storage section 305.

SN 3 that is set in the "V-mode" may be a part of a plurality of SNs 3 that form BH-network 9. For example, in BH network 9, both SN 3 set in the "V mode" and SN 3 in the "normal mode" may be present.

Hereinafter, SN 3 that is set in the "V mode" is abbreviated as "VSN 3", and SN 3 that is not set in the "V mode" is sometimes referred to as "non-VSN 3" or "normal SN 3". In the tree route, VSN 3 performs tree route control so as not correspond to an "inner node", in other words, so as to correspond to a "leaf node" having no child node.

For example, when receiving a control signal transmitted by CN 3 through upstream node 3 or without through upstream node 3, tree route control section 343 of VSN 3 terminates the received control signal and does not perform further transmission of control signal (on purpose).

Thus, VSN 3 does not become a parent node of another SN 3 although VSN 3 may become a child node of CN 3 or another SN 3 in the tree control based on route metric. In other words, VSN 3 does not become an inner node (in other words, relay node or intermediate node) of the tree route.

Therefore, in BH network 9, for example, by transmitting a control signal from CN 3 a plurality of times, the tree route is created or updated such that VSN 3 is removed from the inner node and corresponds to a leaf node.

Since VSN 3 becomes a leaf node of the tree route, the need for the relay processing as performed by the inner node can be eliminated. Therefore, contribution to reduction of the power consumption of VSN 3 is made. For example, as will be described later, since terminal apparatus 7 may be applied to VSN 3, it is possible to reduce the power consumption of terminal apparatus 7. Therefore, it is possible to reduce the battery consumption of terminal apparatus 7, which has a limited capacity.

As will be described hereinafter, VSN 3 (including terminal apparatus 7 operating as VSN 3, the same applies, hereinafter) can join the tree route by receiving, for example, a beacon signal transmitted by any of SNs 3 that form the tree route.

After joining the tree route, VSN 3 determines (selects) and updates a parent node based on the route metric so as to become an entity of a more appropriate route, by receiving one or more control signals transmitted by CN 3.

VSN 3 may transmit (broadcast) a control signal including information indicating that this VSN 3 is not a selection candidate for the parent node, instead of not transmitting the received control signal (control signal used for selection of the parent node). SN 3 that has received the control signal including this information does not select VSN 3 as a parent node. Accordingly, the tree route is created or updated such that VSN 3 corresponds to a leaf node as in the case where VSN 3 does not transmit the received control signal.

Configuration Example of Tree Route Control Section 343

As illustrated in FIG. 5, tree route control section 343 may include, for example, route control packet generation section 3431, route metric calculation section 3432, and tree route update section 3433.

Route control packet generation section 3431 generates a route control packet. The route control packet is an example of the control signal generated in CN 3 and propagated to each node 3 in BH-network 9. For example, CN 3 performs flooding of the control signal to peripheral nodes 3.

When receiving a control signal, SN 3 (except VSN 3) performs flooding of this control signal to peripheral nodes 3. In this manner, the control signal transmitted from CN 3 is propagated or transmitted in BH network 9 in a sequential or chain-reaction manner.

At this time, SN 3 except for VSN 3 may add information to be transferred to other peripheral nodes 3 to the control signal. Non-limiting examples of the information added to the control signal include a route metric calculated by route metric calculation section 3432.

In the case of VSN 3, even when a control signal is received, the control signal is terminated without performing further flooding of the control signal.

A route control packet may include, for example, a route creation packet and a reset packet. The type of these packets may be identified, for example, by the type value of a packet header.

The route creation packet is, for example, a packet transmitted when creating or updating a tree route. The route creation packet may cumulatively include the route metric calculated in each node 3 through which the route creation packet has passed. For example, node 3 may transmit the route metric from the core node to the node immediately before this node 3 by including this route metric in the route creation packet.

SN 3 that has received the route creation packet determines node 3 that becomes a parent node among a plurality of peripheral nodes 3, based on the cumulative route metric.

The reset packet is, for example, a packet transmitted when CN 3 requests SN 3 to clear a tree route. SN 3 that has received the reset packet clears the information on peripheral node 3 registered to the tree route.

Route metric calculation section 3432, for example, calculates a propagation quality index in a radio interval with peripheral node 3 that is the transmission source of the received route creation packet, and obtains a new route metric by adding the result of calculation to the route metric included in the received route creation packet.

For example, Received Signal Strength Indicator (RSSI) may be used as the propagation quality index of the radio interval between nodes 3. For example, a sequence of values obtained by uniformly sampling RSSI with certain time intervals between nodes 3 is represented by Rn (n is an integer equal to or greater than 1), and the sequential average (sequence) An [dB] of RSSI is obtained by the following Expression 1. Expression 1 is only exemplary, and the sequential average of RSSI may be obtained using other mathematical expressions.

[1]

$$A_n = \begin{cases} R_1, & n = 1 \\ \dfrac{A_{n-1} \times (n-1) + R_n}{n}, & n = 2, 3, \ldots \end{cases} \quad \text{(Expression 1)}$$

The sequential average An expressed by Expression 1 converges to the average value of the stochastic process as the value of "n" increases. When "n" is understood as representing, for example, the number of times of transmission (or the number of times of reception) of the route creation packet after the transmission (or reception) of the reset packet, the sequential mean An of RSSI between nodes 3 converges to a constant value in accordance with an increase in the number of times n. Therefore, the tree route created by transmission of route creation packets converges asymptotically to a stable route.

In addition, route metric calculation section 3432 may calculate, by the following Expression 2, the radio wave propagation loss (path-loss) [dB] in a radio interval with transmission source node 3 of the route creation packet by using, for example, the sequential mean An of RSSI calculated by Expression 1.

[2]

$$PathLoss = 10^{\frac{TXPower - RSSI}{10}} \quad \text{(Expression 2)}$$

In Expression 2, "TXPower" represents the transmission power of transmission source node 3 for the route creation packet. The transmission power value of transmission source node 3 may be previously stored in storage section 305, for example, as a known value in individual node 3, or may be included in the route creation packet in transmission source node 3.

The route metric calculation section 3432 obtains a new route metric by adding path-loss calculated according to Expression 2 to the cumulative route metric included in the received route creation packet Thus, the route metric represents the sum of path-losses of the radio intervals between CN 3 and one or more SNs 3. The route metric calculated for each reception of a route creation packet is stored in storage section 305, for example. The route metric stored in storage section 305 may be initialized to a maximum value, for example, by reception of a reset packet.

Tree route update section 3433, for example, selects (updates), as a parent node, the upstream node corresponding to the new route metric, when the new route metric calculated by route metric calculation section 3432 is smaller than the previous route metric.

Here, since the tree route to be created has a tree structure, the number of upstream nodes 3 is always one for individual SN 3. Therefore, tree route update section 3433 is available to create or update a tree route by, for example, determining any one of a plurality of peripheral nodes 3 to be the parent node.

For example, tree route update section 3433 determines one of the transmission source nodes (parent node candidates) of the respective control signals received from the upstream direction to be the parent node based on the route metrics of the routes through which the plurality of route creation packets received from the different routes have propagated, respectively. Therefore, tree route update section 3433 is an example of a determination section that determines a parent node.

Further, in each SN 3, the determination (update) of the parent node is performed in accordance with a change in the route metric calculated for each reception of a route creation packet. Therefore, the update frequency of the tree route can be changed by changing the number of times of transmission of a route creation packet by CN 3 per hour.

For example, as the radio wave propagation environment of BH network 9 is more likely to change, the tracking performance with respect to a change in the radio wave propagation environment of BH network 9 can be more improved by increasing the number of times of transmission per unit time of route creation packets by CN 3.

Here, changes in the radio wave propagation environment of BH network 9 include a change in the radio wave propagation environment of a radio interval between VSN 3 and SN 3 (or CN 3) which is the parent node of VSN 3, due to movement of VSN 3. Therefore, improving the tracking performance with respect to changes in the radio propagation environment as described above contributes to improving the tracking performance with respect to the movement of VSN 3.

The child node, which is downstream node 3, can be grasped by, for example, an acknowledgement (ACK) signal received from downstream node 3 after the downstream route is created. For example, downstream node 3 transmits (unicasts) the ACK signal to parent node 3 that is the transmission source of the route creation packet when downstream node 3 updates the route metric by receiving the route creation packet. In the ACK signal to be unicasted, information on the wireless link in the linked up state stored and managed in downstream node 3 that is the transmission source of the ACK signal may be included, for example. Parent node 3 is available to determine peripheral node 3 to be registered, as a child node by receiving the ACK signal from downstream node 3.

Operation Example

Hereinafter, a description will be given of an operation example of wireless communication system 1 described above.

Figure 6:
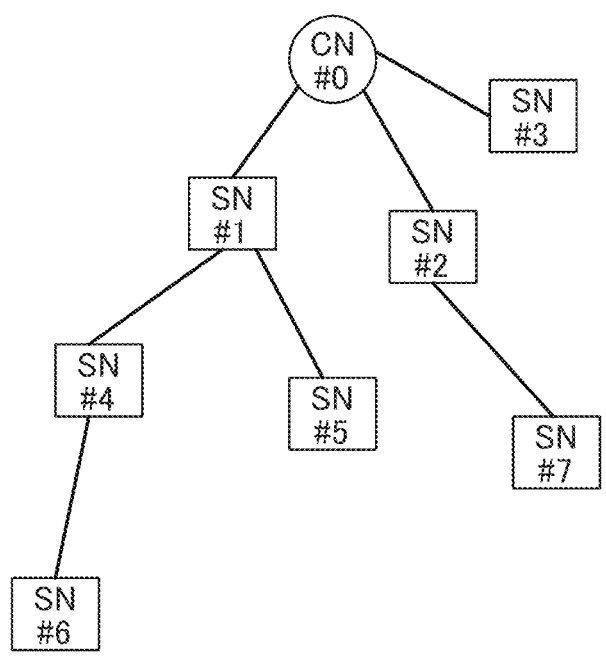
FIG. 6 is a diagram illustrating an exemplary tree route created by tree route control by each node that forms the backhaul (BH) network illustrated in FIG. 1.

FIG. 6 is a diagram illustrating an example of a tree route created by the tree route control by each node 3 (e.g., eight nodes #0 to #7) that forms BH network 9.

Figure 7:
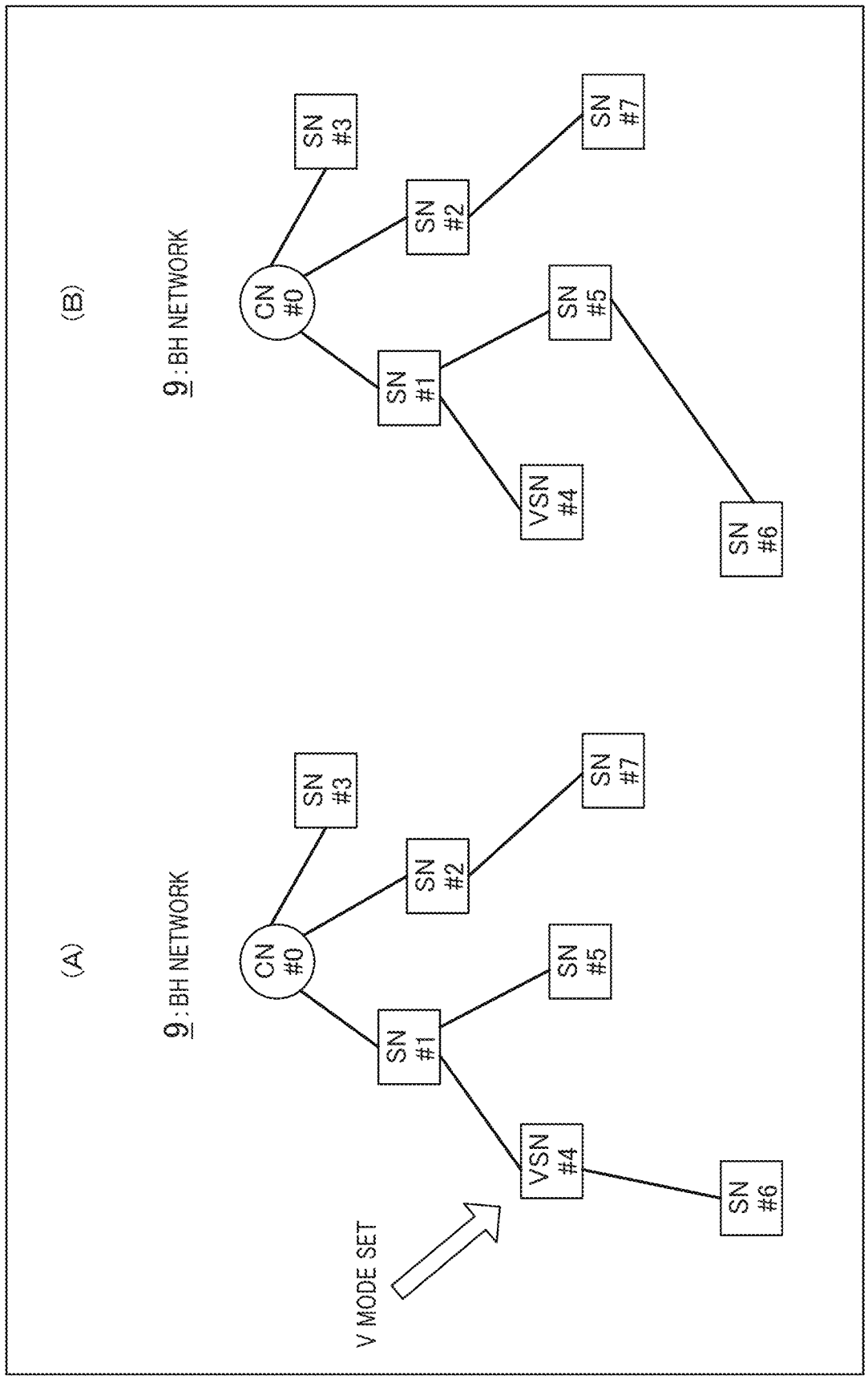
FIG. 7 is a diagram illustrating an exemplary tree route control when a vehicular mode (V mode) is set in one of slave nodes (SNs) that form the tree route illustrated in FIG. 6.
Figure 8:
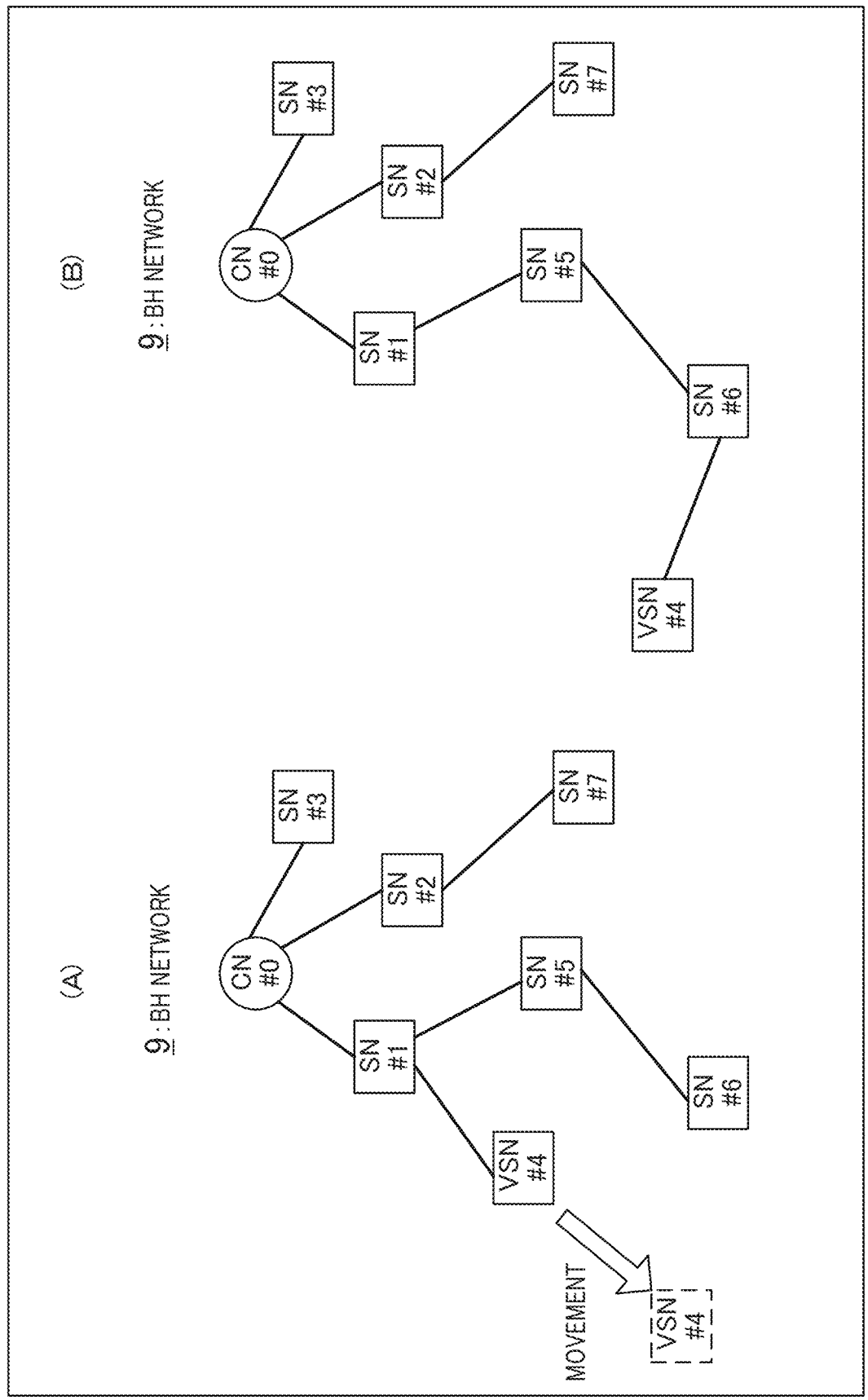
FIG. 8 is a diagram illustrating an exemplary tree route control in a case where a VSN has moved in FIG. 7.

FIG. 7 is a diagram illustrating an exemplary tree route control of a case where one of SNs #1 to #7 (e.g., SN #4) that form the tree route illustrated in FIG. 6 is set to be a VSN. FIG. 8 is a diagram illustrating an exemplary tree route control of a case where VSN #4 has moved in FIG. 7.

As illustrated in (A) of FIG. 7, when SN #4 is set to be a VSN, each of SNs #1 to #3 and SNs #5 to #7, which are not VSN #4, performs flooding of the route creation packets starting from CN #0 in BH network 9.

In (A) of FIG. 7, it is assumed that VSN #4 is located within the service area of SN #1 and SN #5. In this case, VSN #4 receives the route creation packet which has been subjected to flooding by each of SN #1 and SN #5.

In response to reception of the route creation packet, VSN #4 calculates each route metric of, for example, a first route from CN #0 to VSN #4 via SN #1 and a second route from CN #0 to VSN #4 via SN #5.

Then, VSN #4 selects, as a parent node, an upstream node corresponding to a route whose route metric is smaller than others among the calculated route metrics and the previous route metric of the first route stored (managed) before the calculation, and updates the stored (managed) information on the parent node. The "information on the parent node" may be abbreviated as "parent node information," hereinafter.

For example, when the calculated route metric of the first route is the smallest, VSN #4 selects, as a parent node, SN #1, which is the upstream node of the first route. This case is an example of a case in which the parent node of VSN #4 is not changed even when a new route creation packet is received. Depending on the new route metric thus calculated, there may be a case where the parent node of VSN #4 is changed.

Here, VSN #4 calculates the route metric in accordance with reception of a route creation packet as described above, but since it is set in "V-mode", the received route creation packet is terminated, and flooding of the new route metric is not performed by the route creation packet.

Therefore, for example, in (A) of FIG. 7, the new route metric is not transferred to SN #6, which is a child node of VSN #4. SN #6 calculates the new route metric based on the route metric included in the route creation packet received from SN #5, for example.

When the new route metric thus calculated is smaller than the previously stored (managed) route metric, for example, as illustrated in (B) of FIG. 7, SN #6 selects SN #5 as a new parent node and changes (updates) the parent node information subject to management from SN #4 to SN #6.

Thus, in BH network 9, when any one or more SNs 3 is set to VSN 3, the tree route is updated in an autonomously adaptive manner such that VSN 3 does not correspond to an inner node, in other words, such that VSN 3 corresponds to a leaf node having no child node.

Next, a case is assumed where VSN #4 is out of the service areas of SN #1 and SN #5 and moves to the service area of SN #6 as illustrated in (A) of FIG. 8 after update of the tree route as illustrated in (B) of FIG. 7.

In this case, VSN #4 is available to receive a route creation packet from SN #6 without receiving a route creation packet from SN #1 and SN #5. Therefore, VSN #4 receives, from SN #6, the route creation packet arriving at SN #6 from CN #0 via SN #1 and SN #5 in (A) of FIG. 8.

VSN #4 calculates a new route metric in accordance with the reception of the route creation packet from SN #6 and selects parent node 3 based on the new route metric. For example, as illustrated in (B) of FIG. 8, VSN #4 selects SN #6 as a new parent node and updates the parent node information that has been subject to management up to this time from SN #4 to SN #6.

Thus, in the BH network, when VSN 3 set in "V mode" is moved, the tree route tracks the movement of VSN 3 and is updated in an autonomously adaptive manner by calculation of the route metric based on the route creation packet.

Here, VSN 3 can be understood as corresponding to terminal apparatus 7. In other words, terminal apparatus 7 may be utilized as SN 3 that is an infrastructure of BH network 9. For example, terminal apparatus 7 may operate as VSN 3 having, as a parent node, any one of SNs 3 that form BH network 9. Hereinafter, the "terminal apparatus" operating as "VSN" will be referred to as "terminal apparatus (VSN)" for the sake of convenience.

Figure 9:
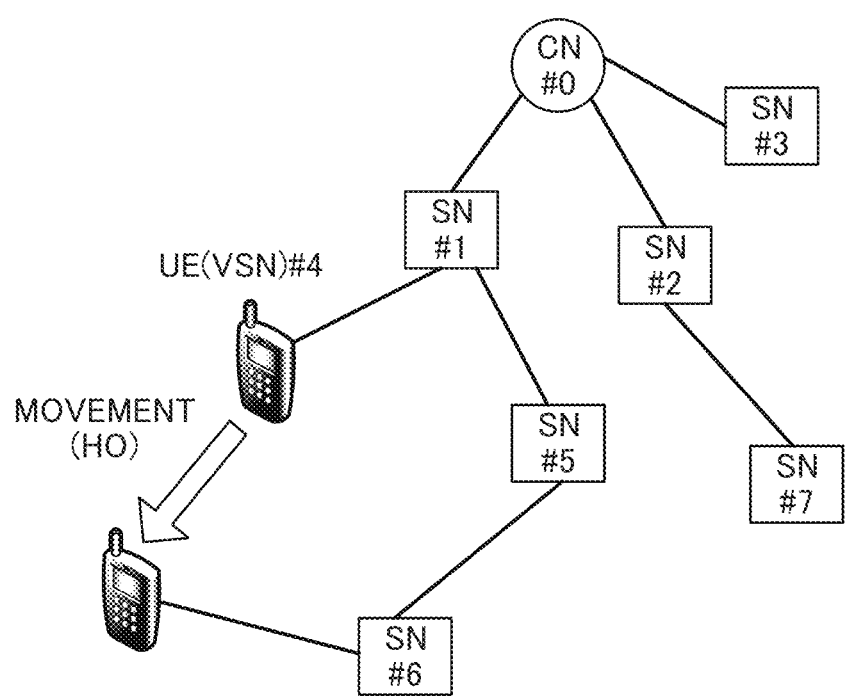
FIG. 9 is a diagram illustrating an exemplary tree route control in a case where a VSN has moved in FIG. 7.

For example, the movement of VSN #4 illustrated in FIG. 8 can be understood as movement of terminal apparatus (VSN) #4, as illustrated in FIG. 9. As described with reference to FIG. 8, since a new tree route is created (updated) tracking the movement of terminal apparatus (VSN) #4, terminal apparatus (VSN) #4 is available for HO (handover or handoff) from source SN #1 to target SN #6 in FIG. 9. Since the same frequency may be allocated to the BH line in BH network 9, terminal apparatus (VSN) #4 is available for soft HO from source SN #1 to target SN #6.

Here, since terminal apparatus (VSN) #4 may be connected to SN #1 or SN #6, which is a parent node, by a wireless BH line, the frequency for a wireless access line may not be individually allocated to terminal apparatus (VSN) #4. For example, the same frequency may be assigned to the wireless access line and the wireless BH line.

For this reason, in terminal apparatus (VSN) 3, for example, wireless IFs 35 and 36 (wireless communication sections 301 and 302 illustrated in FIG. 4) illustrated in FIG. 3 may be shared without distinction between the access line and the BH line. Alternatively, omitting one of wireless IFs 35 and 36 (wireless communication sections 301 and 302) is possible. Therefore, contributions to downsizing, cost reduction and low power consumption of terminal apparatus (VSN) 3 are made.

In other words, the system configuration illustrated in FIG. 9 may be understood as a system configuration in which terminal apparatus (VSN) 3 operates as a part of the infrastructure of the BH line, thereby eliminating the boundary between the infrastructure of the BH line and the terminal apparatus. Further, it may also be understood that the system configuration illustrated in FIG. 9 is a system in which a wireless access line and a wireless BH line are integrated.

In cellular communication, in the generation in which a large number of small cells smaller than a macro cell are superimposed and arranged within a macro cell, the availability of a terminal apparatus for the infrastructure of the BH-line as described above is promising as a form of post-cellular communication.

Next, an operation example focusing on each of CN 3 and SN 3 will be described below with reference to FIGS. 10 to 12. SN 3 may include one or both of VSN 3 and terminal apparatus (VSN) 3.

Operation Example of CN

Figure 10:
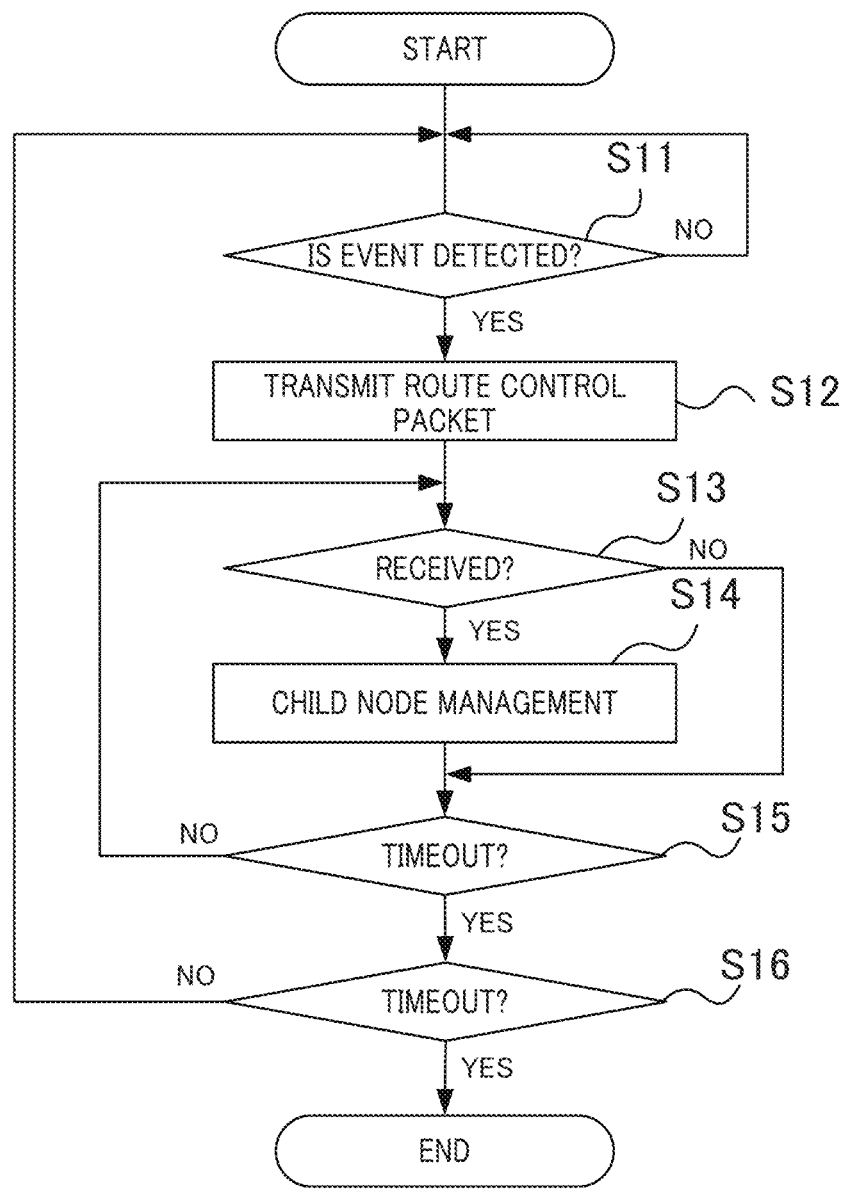
FIG. 10 is a flowchart illustrating an operation example of a core node (CN) including the tree route control according to one embodiment.

FIG. 10 is a flowchart illustrating an operation example of CN3 including a tree route control according to one embodiment. The flowchart of FIG. 10 may be understood as being executed by control section 304 of CN 3 (e.g., cooperation between node management section 342 and tree route control section 343).

As illustrated in FIG. 10, CN 3 monitors, for example, whether or not a predetermined event has been detected (S11; NO). In the "predetermined event", an event in which CN 3 has started up, an event in which the reset button has been operated, and an event in which a predetermined timing has come may be included, for example. One example of the "predetermined timing" is a transmission timing set in order to regularly or irregularly transmit a route control packet, for example.

The transmission period when the route control packet is regularly transmitted may be fixed or may be changed in accordance with the number of times the flowchart in FIG. 10 is executed because the tree route created in this embodiment is asymptotically stable. A predetermined time of day may be set as the "predetermined timing" so that the tree route is updated in accordance with weekends and time zones such as nighttime and daytime of a day, for example.

When the predetermined event is detected (S11; Yes), CN 3 generates a route control packet and transmits (performs flooding of) the route control packet through, for example, wireless communication section 302 (S12).

For example, when the startup of CN 3 is detected and when the transmission timing of the route creation packet is detected, the route creation packet is transmitted to peripheral SN 3. When the operation of the reset button is detected and when the transmission timing of the reset packet is detected, the reset packet is transmitted to peripheral SN 3.

After transmitting the route control packet, CN 3 monitors, for example, whether or not the route control packet is received through wireless communication section 302 from any one or more peripheral nodes 3 (S13). Monitoring whether or not the route control packet is received may be interpreted as waiting for reception of the route control packet.

When the route control packet is received from any one or more peripheral nodes 3 (S13; YES), CN 3 manages child nodes by, for example, node management section 342 (S14).

For example, when a route control packet is newly received from peripheral node 3 of CN 3, CN 3 stores and registers the node identification information on the transmission source node of the received route control packet in storage section 305 as child node information.

When the received route control packet is a packet with the node identification information that has already been registered to storage section 305 as the transmission source of the packet, CN 3 checks whether or not the received route control packet is a packet that has passed through SN 3 different from the registered transmission source.

For example, when each SN 3 puts a route metric in a route control packet as described later, including corresponding node identification information in the packet together with the route metric allows CN 3 to identify whether or not the route through which the received route control packet has passed is different or the same.

When the received route control packet is a packet that has passed through SN 3 different from the registered child node, CN 3 may delete the child node information that has been registered to storage section 305.

When the received route control packet is not a packet that has passed through SN 3 different from the registered child node, CN 3 maintains the child node information that has been registered to storage section 305.

Thereafter, CN 3 monitors whether or not a constant time (e.g., transmission interval of a route control packet) has passed (timeout) (S15). When a route control packet is not received in a process of S14 (NO), CN 3 skips the process of S14 and moves the processing to S15.

When timeout is not detected (S15; NO), CN 3 moves the processing to S13.

Meanwhile, when timeout is detected (S 15; YES), CN 3 monitors whether or not a constant time (for example, the time given to the tree route control) has passed (timeout) (S16), for example.

When timeout is not detected (S16; NO), control section 304 of CN 3 moves the processing to S11.

Meanwhile, when timeout is detected (S 16; YES), control section 304 of CN 3 ends the tree route control.

As described above, CN 3 adaptively updates SN 3 subject to management, as a child node of CN 3, in the tree route having CN 3 as the vertex by repeating transmission of the route control packet and management of the child node during a given time for the tree route control.

Operation Example of SN

Next, an operation example of SN 3 will be described with reference to FIG. 11. The flowchart of FIG. 11 may be understood as being executed by control section 304 of SN 3 (e.g., cooperation between node management section 342 and tree route control section 343). SN 3 may include one or both of VSN 3 and terminal apparatus (VSN) 3.

For example, SN 3 monitors whether or not a route control packet is received in wireless communication section 302 (S21; NO).

When reception of a route control packet is detected (S21; YES), SN 3 checks the type of route control packet. For example, SN 3 checks whether the received route control packet is a reset packet or a route creation packet (S22 and S24).

When the received route control packet is a reset packet (S22; YES), SN 3 performs initialization processing (S23). The initialization processing may include, for example, the following processing:

deletion of peripheral node information that has been registered to storage section 305; and initialization to the initial value (e.g., the largest value) of a route metric in storage section 305.

After the initialization processing, control section 304, for example, transmits (performs flooding of) the received reset packet to peripheral SN 3 (S23a). The reset packet may include an identifier (ID). Each node 3 may store the ID included in the received reset packet.

When the ID of the received reset packet matches the stored ID, in other words, the ID indicates that the received reset packet is a reset packet that has been transmitted (transferred) in the past, each node 3 does not perform further transmission of the reset packet. This makes it possible to prevent the reset packet from looping in BH network 9.

Meanwhile, when the received route control packet is not a reset packet (S22; NO), SN 3 checks whether or not the route control packet is a route creation packet (S24).

When the received route control packet is a route creation packet (S24; YES), SN 3 calculates a propagation quality index (e.g., radio wave propagation loss) of the radio interval in which the route creation packet is received (S25).

Control section 304 calculates a route metric based on the calculated radio wave propagation loss (S26). For example, SN 3 calculates a cumulative radio wave propagation loss as a new route metric by adding the calculated radio wave propagation loss and the propagation quality indicator included in the received route creation packet.

SN 3 determines whether or not update of the route metric is necessary by comparing the new route metric with the previous route metric stored before the calculation of the new route metric (S27).

For example, when the new route metric is smaller than the previous route metric, SN 3 determines to update the previous route metric to the new route metric (S27; YES). In response to the determination, SN 3 selects and updates upstream node 3 corresponding to the new route metric in the peripheral node information as a parent node (S28).

After updating the parent node, SN 3 checks whether or not "V-mode" is set (S29). When "V-mode" is not set (S29; NO), SN 3, for example, transmits a route creation packet including, the new route metric to peripheral SN 3 (S30).

Meanwhile, when "V-mode" is set (S29; YES), SN (VSN) 3 skips (in other words, terminates) the process of S30, and does not transmit a route creation packet including the new route metric.

Thereafter, control section 304 monitors whether or not a constant time (e.g., a time given to the tree route control) has passed (timeout) (S31).

When timeout is not detected (S31; NO), SN 3 moves the processing to a reception monitor process (S21) of a route control packet. Meanwhile, when timeout is detected (S 31; YES), SN3 may terminate the tree route control.

When the received route control packet is neither a reset packet nor a route creation packet (S22 and S24; NO), SN 3 may move the processing to the reception monitoring process (S21) of a route control packet.

When the calculated new route metric is equal to or larger than the previous route metric and update of the parent node is determined to be unnecessary (S27; NO), SN 3 may move the processing to the reception monitoring process (S21) of a route control packet.

As described above, SN 3 adaptively updates the parent node to be selected (or managed) by SN 3 in the tree route based on the route metric for each reception of a route creation packet. Accordingly, a more appropriate tree route is created and updated tracking changes in the radio wave propagation environment of radio intervals (in other words, wireless BH lines) that form BH networks 9.

When receiving a route creation packet, VSN 3 terminates the route creation packet and does not perform further transmission of the route creation packet and thus is no longer a relay node of the tree route. Therefore, unlike SN 3 in the normal mode, VSN 3 need not perform relaying processing for packets (which may include both of a route control packet and data packet). Therefore, the power consumption of VSN 3 can be reduced.

(Joining of Terminal Apparatus in Tree Route)

Next, an exemplary procedure of an operation for terminal apparatus 7 to join a tree route as VSN 3 will be described with reference to the flowchart of FIG. 12.

Terminal apparatus 7 monitors, for example, whether or not a beacon signal is received in accordance with startup (S41; NO). Monitoring reception of a beacon signal may be interpreted as waiting for reception of a beacon signal.

When receiving a beacon signal, terminal apparatus 7 stores and manages included peripheral node information, for example, in storage section 305, and performs an association procedure of transmission source SN 3 of the received beacon signal (S42).

Through the association procedure, terminal apparatus 7 joins the tree route to which transmission source SN 3 of the beacon signal belongs. Terminal apparatus 7 may wait for reception of a beacon signal in the process of S41 by transmitting a probe request signal of active scan to peripheral node 3.

Figure 11:
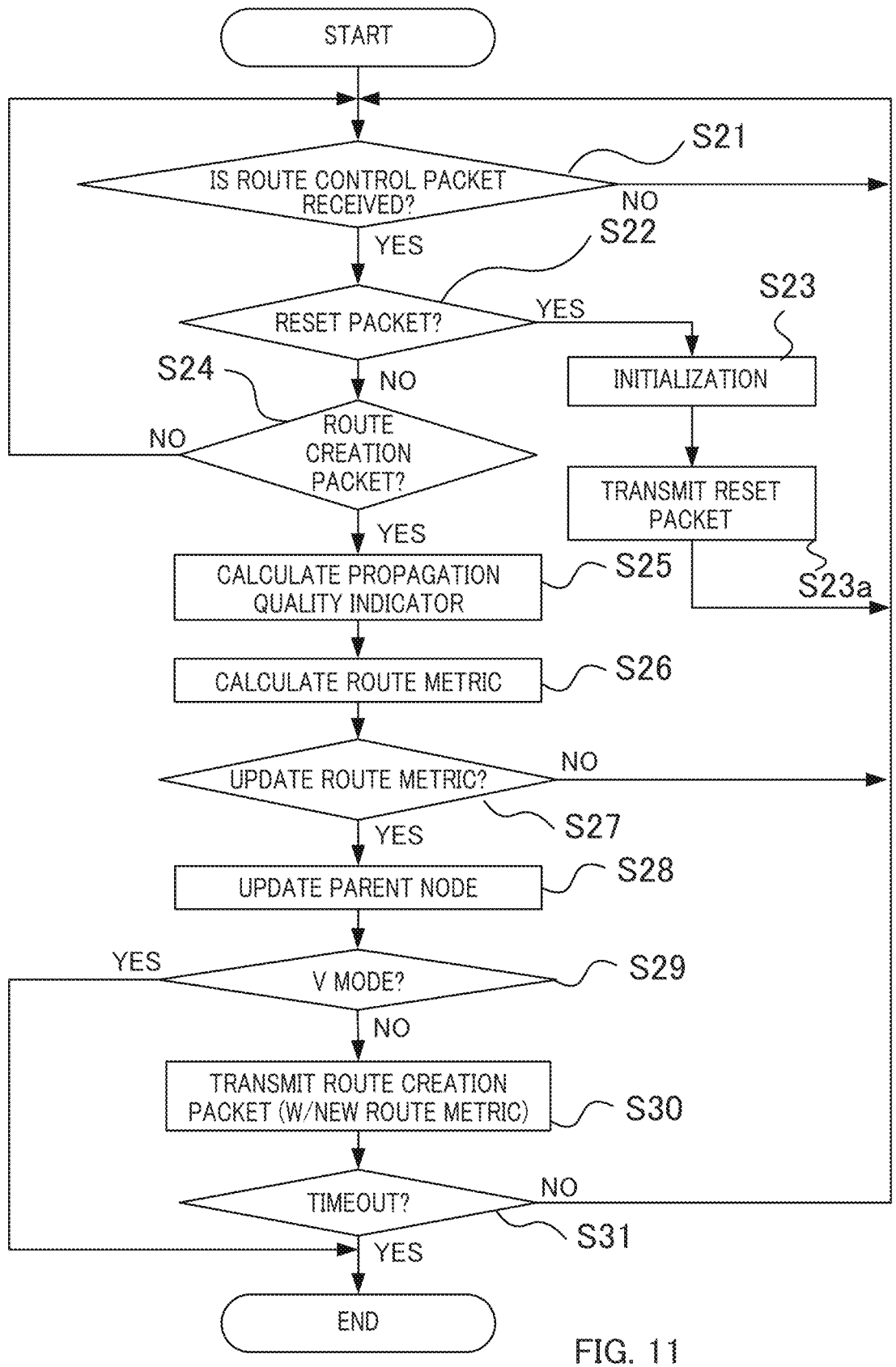
FIG. 11 is a flowchart illustrating an operation example of an SN including a tree route control according to one embodiment.
Figure 12:
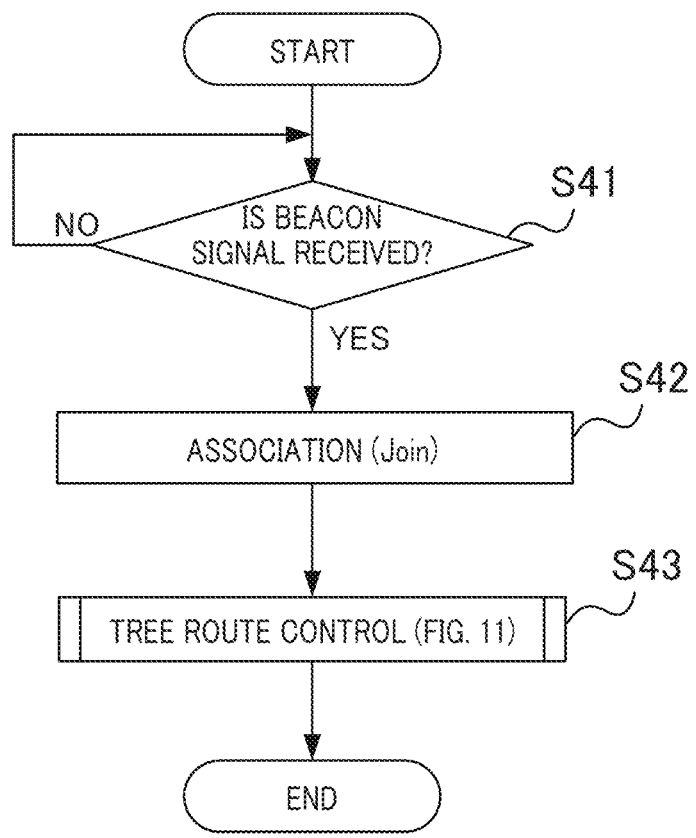
FIG. 12 is a flowchart illustrating an operation example of an SN (VSN) set in the V mode, according to one embodiment.

After joining the tree route, terminal apparatus 7 operates in accordance with the flowchart illustrated in FIG. 11 (S43). For example, as described in FIG. 11, as with VSN 3, terminal apparatus 7 adaptively updates the parent node selected (or managed) in the tree route based on the route metric for each reception of a route creation packet.

The processing of updating, by terminal apparatus 7, the parent node to be selected, after joining the tree route is not limited to reception of a route creation packet, but may be performed by reception of a beacon signal. The beacon signals may be transmitted more frequently than the route creation packets. In this case, it is possible to increase the number of opportunities (in other words, frequency) of selecting and updating a parent node by terminal apparatus 7.

In terminal apparatus 7, since it is determined in the process of S29 of FIG. 11 that "V-mode" is set (YES), transmission of the route creation packet including the new route metric is not performed (skipped). The setting of "V-mode" for terminal apparatus 7 may be performed by, for example, reception of a beacon signal from peripheral node 3, or may be performed in the association procedure in the process of S42.

As described above, terminal apparatus 7 that operates as VSN 3 performs the association procedure with SN 3 that has been able to receive a beacon signal among a plurality of SNs 3 that form BH network 9, thereby making it possible to quickly join BH network 9.

Terminal apparatus 7 terminates the received route creation packet after determining the parent node based on the route metric by receiving the route creation packet, and does not perform further transmission of the received route creation packet. Thus, every time CN 3 transmits a route creation packet, the tree route is adaptively updated such that terminal apparatus 7 does not correspond to a relay node.

Accordingly, since terminal apparatus 7 does not perform the relay processing of packets, it is possible to reduce the power consumption of terminal apparatus 7. Therefore, it is possible to reduce the battery consumption of terminal apparatus 7, which has a limited capacity.

REFERENCE SIGNS LIST

1 Wireless communication system
3 Wireless node
5 Backbone network
7 Terminal apparatus
9 Backhaul (BH) network
31 Processor
32 Memory
33 Storage
34 Input/output (I/O) apparatus
35, 36 Wireless interface (IF)
37, 39 Wired interface (IF)
38 Bus
301, 302 Wireless communication section
303 Wired communication section
304 Control section
305 Storage section
341 Scan processing section
342 Node management section
343 Tree route control section
344 Mode setting section
350, 360 Antenna
3431 Route control packet generation section
3432 Route metric calculation section
3433 Tree route update section

What is claimed is:

1. A wireless route control method, comprising:
broadcasting a control signal from a first wireless node among a plurality of wireless nodes that form a backhaul network, the control signal being used for selecting a parent node in a tree route;
selecting, by each of a plurality of second wireless nodes being different from the first wireless node, one of transmission source nodes, as a parent node, among the plurality of wireless nodes based on an indicator indicative of a radio wave propagation quality of a route through which each of a plurality of control signals received through different routes has propagated, each of the transmission source nodes broadcasting the control signal;
broadcasting, by a fixed wireless node among the plurality of second wireless nodes, the control signal to another one or more of the plurality of second wireless nodes; and terminating, by a mobile wireless node among the plurality of second wireless nodes, the control signal.

2. The wireless route control method according to claim 1, wherein:
the first wireless node broadcasts the control signal multiple times, and
each of the fixed wireless node and the mobile wireless node among the plurality of second wireless nodes updates selection of the parent node in accordance with a variation in the indicator calculated for each reception of the control signal broadcasted multiple times.

3. The wireless route control method according to claim 1, wherein:
the mobile wireless node is a user apparatus.

4. The wireless route control method according to claim 3, wherein:
when receiving a beacon signal broadcasted by the first wireless node or any of the plurality of second wireless nodes, the user apparatus joins the backhaul network by performing an association procedure with a transmission source node of the beacon signal.

5. A wireless communication system, comprising:
a first wireless node among a plurality of wireless nodes that form a backhaul network, the first wireless node broadcasting a control signal used for selecting a parent node in a tree route;
a plurality of second wireless nodes being different from the first wireless node among the plurality of wireless nodes, each of the plurality of second wireless nodes determining, as a parent node, one of transmission source nodes based on an indicator indicative of a radio wave propagation quality of a route through which each of a plurality of control signals received through different routes has propagated, each of the transmission source nodes broadcasting the control signal, wherein
a fixed wireless node among the plurality of second wireless nodes broadcasts the control signal to another one or more of the plurality of second wireless nodes, and
a mobile wireless node among the plurality of second wireless nodes terminates the control signal.

6. A wireless node being one of a plurality of second wireless nodes different from a first wireless node among a plurality of wireless nodes that form a backhaul network, the wireless node comprising:
a receiver that receives a control signal used for selecting a parent node in a tree route, the control signal being broadcasted by the first wireless node;
a processor that:
sets, in a storage section, information indicating whether the second wireless node is mobile;
determines, as a parent node, one of transmission source nodes based on an indicator indicative of a radio wave propagation quality of a route through which each of a plurality of control signals received through different routes has propagated, each of the transmission source nodes broadcasting the control signal; and
a transmitter that broadcasts the control signal when the information is not indicative of being mobile, and that terminates the control signal when the information is indicative of being mobile.

7. A computer-readable non-transitory recording medium having stored therein a wireless route control program causing a processor to execute processing, the processor being included in one of a plurality of second wireless nodes different from a first wireless node among a plurality of wireless nodes that form a backhaul network, the processing comprising:
setting, in a storage section, information indicating whether the second wireless node is mobile;
receiving a control signal used for selecting a parent node in a tree route, the control signal being broadcast by the first wireless node;
determining, as a parent node, one of transmission source nodes based on an indicator indicative of a radio wave propagation quality of a route through which each of a plurality of control signals received through different routes has propagated, each of the transmission source nodes broadcasting the control signals; and
broadcasting the control signal when the information is not indicative of being mobile, and terminating the control signal when the information is indicative of being mobile.

* * * * *